June 12, 1962  F. A. GUERTH  3,039,002
ELECTROOPTICAL TRACKING APPARATUS
Filed Oct. 11, 1960  2 Sheets-Sheet 1

INVENTOR.
FRITZ A. GUERTH

INVENTOR.
FRITZ A. GUERTH

3,039,002
ELECTROOPTICAL TRACKING APPARATUS

Fritz A. Guerth, Camarillo, Calif., assignor to the United States of America as represented by the Secretary of the Navy
Filed Oct. 11, 1960, Ser. No. 62,061
7 Claims. (Cl. 250—203)
(Granted under Title 35, U.S. Code (1952), sec. 266)

The invention described herein may be manufactured and used by or for the Government of the United States of America for governmental purposes without the payment of any royalties thereon or therefor.

The present invention relates to tracking controls of the type intended to regulate the orientation, or direction of aim, of a television pickup tube or photographic camera in a manner to cause such tube or camera to follow the path of a moving airborne object such as a guided missile. After being recorded on some suitable medium, the trajectory of the object being tracked can be subsequently evaluated and/or analyzed to yield information as to certain aspects of missile performance.

Many types of apparatus are available by means of which an operator can vary the position of such a tracking device by observing the missile during flight and then manually actuating in selective fashion a pair of controls to maintain the optical assembly in correct alignment with the moving object. In other words, the tracking unit is mounted in such a manner as to be rotatable from side to side (azimuth) or tilted in an upward or downward direction (elevation). These horizontal and vertical camera movements are customarily brought about by selective energization of a pair of servomotors, the magnitude of this energization being determined by the tracker himself as for example through changes in the setting of potentiometers incorporated in the respective servomotor circuits.

When systems of the above type are utilized, it has been found that considerable difficulty exists in achieving a precise alignment of the camera with the object being tracked due to the inability of even an experienced operator to accurately follow the flight of a high-speed target such as a guided missile. Consequently, automatic or semiautomatic systems have been developed which incorporate optical (or electrooptical) components receiving light from the target and translating changes in target position into electrical variations which are then selectively applied to the repositioning servomotors. Such an automatic control system may include such optical components as photoelectric cells the output of which is normally balanced at a predetermined magnitude when the tracking camera is properly aligned, but which becomes unbalanced when the target, because of changes in its speed or trajectory, becomes displaced from its previous location in the field of view of the camera. The unbalanced currents thus generated cause an acceleration or deceleration of the respective driving motors to thereby restore the central position of the target as imaged by the tracking apparatus. Normally the camera unit and the control circuitry are physically associated in the same housing and movable as a unit, so that the field of view of the camera essentially coincides with that of the control apparatus.

The principal disadvantage in automatic or semiautomatic tracking systems of the type discussed above is that positional information concerning the target is customarily derived by obtaining an electrical variation representative of the target's position, and then differentiating this signal to generate a sharp pulse. The displacement of this pulse with respect to a previously-developed pulse is then indicative of target movement in a particular direction. It has been found that when the target is at a considerable distance from the tracking camera, or when it is partially obscured as a result by atmospheric conditions, the pulse thus generated may be extremely weak and difficult to separate from other pulses induced by noise or by a non-uniform background. Consequently, in such cases the tracking servos do not necessarily receive control energy of such a magnitude as to maintain correct target alignment.

In accordance with one feature of the present invention, the above-mentioned drawback is overcome by developing a number of represenatations of some particular target characteristic (such as parallel boundaries or surface lines) and then requiring a positional coincidence not only of one of these representations, but of the entire group or set thereof. Thus, there is little chance of a sharp noise pulse being tracked in error following a movement of the target between successive scans, as the complete "picture" of the missile or other target is utilized for comparison purposes. The tracking process is accordingly made more precise and its reliability greatly enhanced.

In accordance with another feature of the present invention, an automatic optical tracking system is provided which makes use of a pair of television pickup tubes designed to respectively yield information concerning the azimuthal and elevational characteristics of a target being tracked. A fundamental principle underlying the operation of the concept resides in scanning the object's field of view in such a manner that successive scans are parallel but progressively offset with respect to one another in a lateral direction. The result is that each field scanned by a particular pickup tube is "canted" or "skewed" in a direction designated as "vertical" in television terminology. Between such pickup tube and the target, or, in other words, in the optical path of light arriving at the tracking apparatus, are two condensing lenses respectively associated with the azimuthal and elevational pickup tubes. These lenses serve to focus the impinging light in a single direction only, so that each line scan of one pickup tube (representing the target's elevation, for example) will contain identical information. Thus the wave form of each line scan will be identical for a predetermined number of such line scans in either direction from the midpoint of the raster. Expressed still differently, the video output of the camera tube, for a selected number of line sweeps, will be repeated in a cyclic manner.

The present concept contemplates storing energy representing the center line scan of the pickup tube for a period of time covering several cycles of operation of the tracking apparatus. After such an interval, the target field of view is again scanned in the same manner as before, and all of the line scans developed thereby are compared with the prior center line scan which has been stored by some suitable memory device. If there has been no movement of the target between the two field-scanning operations, then the center line scan of the subsequently-scanned field will be identical in phase (position) to the stored energy, and, if one of these two wave forms is inverted in polarity, the output resulting from their addition will be zero. However, if there has been a target movement between these two field-scanning actions, then the stored line scan will not exactly match the center line scan of the last-developed field, but, due to the "canted" configuration of successive line scans in this latter field, the center line scan first developed will find its counterpart in a line scan of the latter field which occurs either prior to the stored center line scan or subsequent thereto insofar as the field mid-point is concerned. In other words, "matching" of the center line scan of the first-developed field will take place either "above" or "below"

the center of the last-developed scanning field. Accordingly, the wave form of the memorized line scan will find its counterpart above or below the center line scan of the last-developed field, assuming that target movement has occurred. If such movement has been in one particular direction (say, for example, to the right), then the "matching" will occur above the center of the last-developed field, while, in the same way, if target movement has been, for example, to the left, then "matching" will occur below such center field point. Conventional electronic comparison circuits can develop from this "matching" action an error voltage which is of one polarity when the "matching" occurs above the center field point and of opposite polarity when the "matchinng" occurs below such point. This error voltage is applied in a conventional fashion to the servo motors of the tracking apparatus to realign the latter in the manner described. The basic advantage of applicant's system as compared to prior arrangements resides in the "matching" of a pair of complete line scans, rather than a pair of isolated pulses, since each line scan includes a number of indications representative of some particular target characteristic.

One object of the present invention, therefore, is to provide an improved electrooptical tracking system of the type incorporating automatic repositioning controls.

Another object of the invention is to provide an electrooptical tracking system employing a pair of television pickup tubes respectively designed to yield azimuthal and elevational information concerning a moving target such as a guided missile.

A still further object of the invention is to provide an electrooptical tracking system in which a field of view, including the object being tracked, is scanned at a certain instant of time, the same field scanned at a subsequent time, and then portions of the two scannings compared in such a manner that discrepancy therebetween initiates a reorientation of the tracking apparatus.

Other objects and many of the attendant advantages of this invention will be readily appreciated as the same become better understood by reference to the following detailed description when considered in connection with the accompanying drawings wherein.

Figure 1:
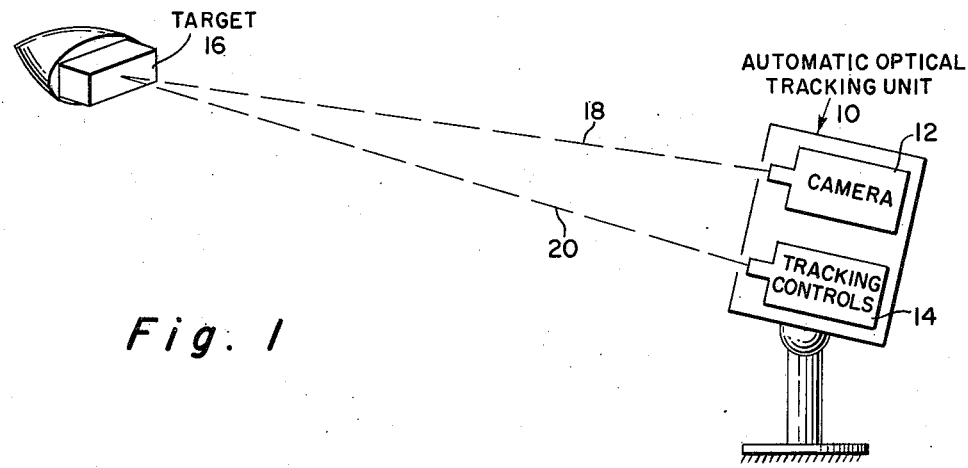
FIG. 1 is a schematic illustration of an automatic optical tracking unit designed in accordance with a preferred embodiment of the present invention.

Referring first to FIG. 1 of the drawings, there is shown an automatic optical tracking unit which is generally designated by the reference numeral 10. This unit 10 includes in more or less standard fashion a camera 12 and a set of tracking controls 14 the design and operation of which will be set forth in connection with a description of FIG. 2 of the drawings. At the present time it need only be understood that the camera 12 and the controls 14 are rigidly positioned within the unit 10 in such fashion that they may be optically aligned as a unit with a target 16. The arrangement of the assemblies 12 and 14 is such that any object which is within the field of view of the camera 12 is also within the field of view of the optical components associated with the tracking controls 14. Expressed differently, an object which is centrally located in the field of the tracking controls 14 will also be imaged centrally in the focal plane of the camera 12. However, arrangements of this nature are now known in the art, and merely serve to provide a background for the novel features of applicant's invention to be subsequently described. The tracking unit 10 is mounted in universal fashion upon a rigid foundation so that it is movable in two mutually perpendicular directions with respect thereto. Although not shown in the drawing, the unit 10 of FIG. 1 possesses means for causing it to move in a horizontal plane (azimuthal control) and also means for causing it to move in a vertical plane (elevational control). Such means have not been illustrated in the drawing since they may be of conventional nature, consisting for example of a pair of servo motors selectively energized either manually by the tracking operator or automatically by voltages derived from tracking apparatus 14.

Figure 2:
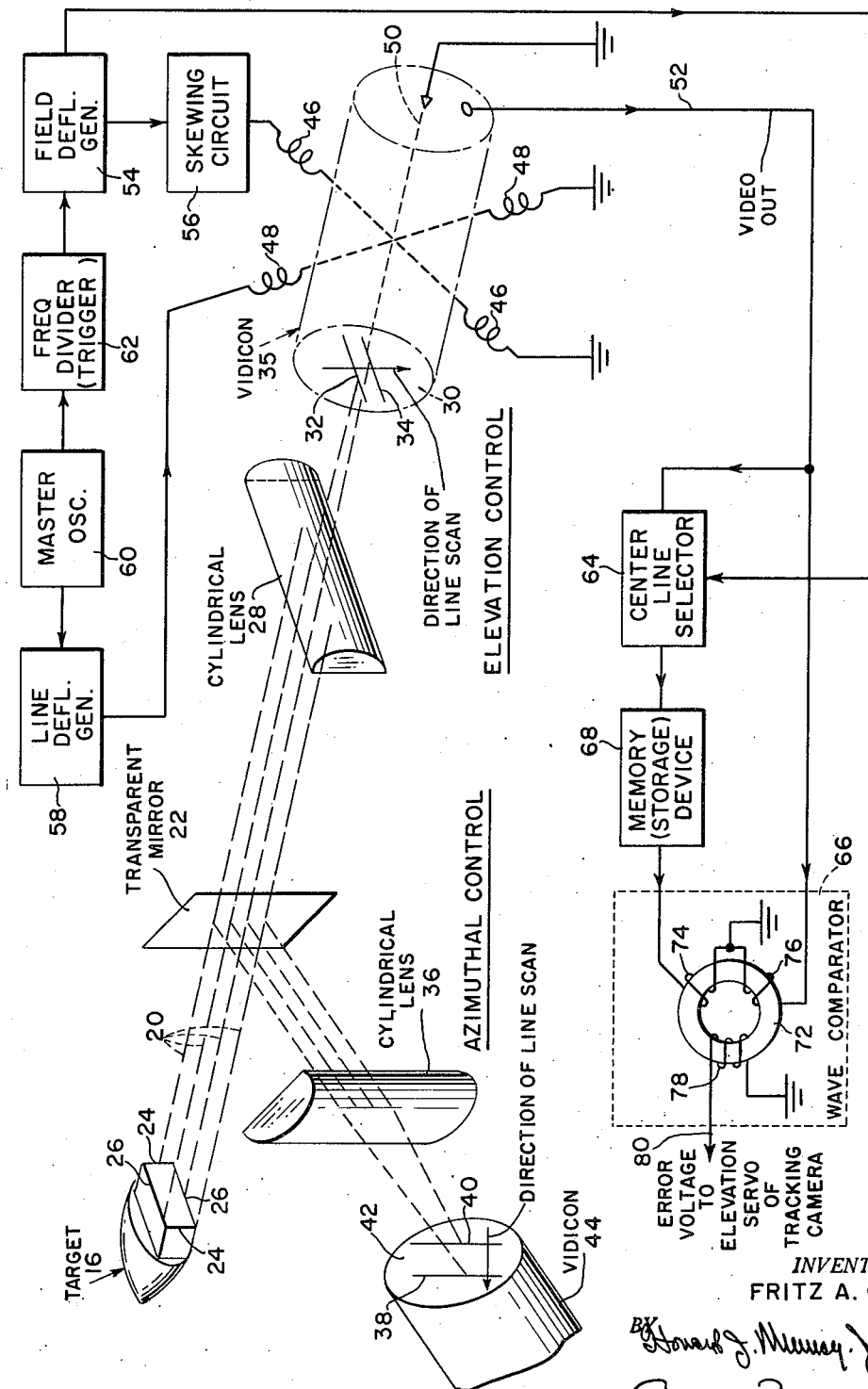
FIG. 2 is a detailed showing of certain of the components included in the tracking control portion of FIG. 1, together with a presentation of one manner in which control voltages may be derived therefrom for effecting a reorientation of the tracking camera.

In order that the unit 10 of FIG. 1 accurately track the target 16 when the latter undergoes changes in speed and/or direction, it is desirable that such changes be translated into electrical variations suitable for energizing one or both of the positioning controls according to the nature of these changes. In FIG. 2 of the drawings there is illustrated a preferred form of circuit for accomplishing this result. Before considering the showing of FIG. 2, it should be understood that certain of the components of the tracking control 14 are illustrated in connection with other elements which need not be directly incorporated in the tracking unit 10 but are merely shown as being associated therewith for the sake of convenience of description.

Referring again momentarily to FIG. 1, it will be appreciated that the camera 12 receives light from the target 16 along an optical path 18, and that the tracking control mechanism 14 similarly receives light from target 16 along an optical path 20. The angular relationship between the light paths 18 and 20 is greatly exaggerated in the drawing, and in practice these two paths are essentially parallel to one another.

The optical path 20 represented by the single broken line in FIG. 1 is in reality made up of a bundle of parallel light rays, as schematically set forth in FIG. 2. These light rays 20 from target 16 impinge upon one surface of a semitransparent plane mirror 22 which forms parts of the tracking control apparatus 14 of FIG. 1. For convenience of description, the target 16 is assumed to include at least two vertical boundaries 24 and at least two horizontal boundaries 26. The reason for this assumption will later become apparent.

The semitransparent plane mirror 22 lies at an angle of approximately 45° to the optical path 20 and is of a design which transmits therethrough a portion of each impinging light ray 20 and reflects a portion of such light ray, this reflection being at an angle essentially 90° to the path of the arriving energy. Positioned in the path of the light passing through mirror 22 is a lens 28 which is of semicylindrical configuration—i.e., the lens 28 acts to compress and bring to a focus rays representing those portions 26 of the target 16 which extend horizontally, or essentially parallel to the principal axis of the lens. However, those light rays representing the vertical boundaries 24 of target 16 will not be thus focused, and will not yield an image in the focal plane of the lens. Consequently, the horizontal boundaries 26 of target 16 will form, on a plane surface 30, a pair of essentially parallel spaced-apart traces 32 and 34 which are respectively associated optically with the two horizontal boundaries 26 of the target. However, as above stated, the vertical boundaries 24 of target 16 will not appear in the focal plane 30 of lens 28 due to the optical nature of this component. If the surface 30 forms the photosensitive screen of a television pickup tube 35, such as a Vidicon, then the traces 32 and 34 will develop on the mosaic a charge image which can be traversed by the electron scanning beam of the tube. The plane of the photosensitive screen of the Vidicon 35 has been angularly displaced in the drawing to more clearly show the traces 32 and 34 formed thereon.

The ray portions reflected at an angle of substantially 90° to the principal light path by the semitransparent mirror 22 fall upon a further cylindrical lens 36 which may be similar in all respects to lens 28 except that it is positioned in a manner essentially perpendicular thereto.

As a result, the vertical boundaries 24 of target 16 (which formed no effective image on the focal plane 30 after passing through lens 28) now yield a pair of parallel spaced-apart vertical traces 38 and 40 on a planar surface 42 which, as in the case of surface 30, may comprise the photosensitive screen of a further television pickup tube 44.

Each of the components 28, 35, 36 and 44 may be incorporated within the housing of the tracking unit 10 of FIG. 1. In cases where the target is at a considerable distance from the tracking apparatus, the two Vidicons 35 and 44 may be placed side-by-side so that their axes are essentially parallel to one another, and the mirror 22 omitted. In any event, the orientation of the lenses 28 and 36 with respect to the optical path 20 varies as a function of changes in the speed and/or direction of movement of the target 16.

The television pickup tubes 35 and 44 are each provided with means for deflecting the electron scanning beam thereof in two mutually perpendicular directions. In the case of the tube 35, this means comprises a pair of line deflection coils 46 and a pair of field deflection coils 48. The tube 44 is similarly equipped, but such deflection means is not included in the drawings. The output of the Vidicon 35 provides an elevational control for the tracking unit 10, while the output of the Vidicon 44 provides an azimuthal control. Since the circuitry for generating each of these control voltages is identical, only the elevational control components have been illustrated in the drawing. It will be understood that a set of elements similar to those set forth in FIG. 2 are employed in connection with the Vidicon 44 to develop a control voltage for application to the azimuthal servo motors (not shown) of the unit 10.

For the purpose of applicant's invention, it is necessary that the electron scanning beam 50 of the Vidicon 35 be so deflected that it scans the photosensitive screen 30 with the direction of each line traversal of the beam being essentially normal to the parallel charge images represented by the traces 32 and 34. This direction of line scanning is indicated in FIG. 2 of the drawings by an arrow. Inasmuch as these charge images 32 and 34 extend completely across the screen of the Vidicon 35, each line scan of the beam 50 will yield an identical output which appears in an output conductor 52. Successive line scans are "vertically" displaced from one another as in conventional television practice by current flowing through the coils 48 from a field deflection generator 54. Normally each line scan would positionally be displaced in but a single direction from the next preceding line scan to form a raster area of generally rectangular configuration. However, in accordance with an important feature of the present concept, successive line scans are additionally displaced or offset laterally in a "horizontal" direction, so that those points representing the initiation of each line scan define a line which bears an angular relationship to the vertical. Expressed differently, the raster formed by all of the line scans making up a single field is not rectangular, but instead "canted" or "skewed" so that the outline of the raster defines a parallelogram.

This "skewing" effect is produced by means of circuit 56 which adds a progressively increasing bias to the output of the field deflection generator 54. As will be set forth later in a discussion of FIG. 3, successive line scans on the screen 30 will yield output wave forms in conductor 52 having the general appearance of curves *a* through *j*, each line scan being displaced laterally in the manner illustrated. Both the field deflection generator 54 and the line deflection generator 58 are synchronized from a master oscillator 60, the output of the latter being applied to the generator 54 through a trigger circuit 62. The action of the trigger circuit 62 is to cyclically select in regular sequence a portion of the output of the oscillator 60 to energize the deflection generator 54, since, for the purpose of applicant's invention, it is only necessary that certain selected fields be scanned by the Vidicon 35, such, for example, as every tenth field of those which would normally occur in regular sequence. The reason for this mode of operation is to allow the screen 30 to be fully discharged by the impingement of light thereon between successive scannings by the electron beam 50.

The output of the Vidicon 35 (which consists of successive line scans of the screen 30 in the direction indicated by the arrow in the drawing) is applied both to a center line selector 64 and to a wave comparator 66. The center line selector 64 also receives the output of field deflection generator 54. This selector 64 acts as a gate which opens when the field deflection saw-tooth energy reaches a predetermined level to permit the output of tube 35 to pass therethrough to a "memory," or storage device 68. Expressed differently, the unit 64 selects from the video output of tube 35 only the center line scan of a field, this center line scan being represented in FIG. 3 by the wave form *a*. Such single line scan is stored by the memory device 68 for utilization in a manner to be subsequently explained. The center line selector 64 may be a conventional vacuum tube-operated gate to which the output of the field deflection generator 54 is applied so that the video signal is passed through the gate only at a predetermined potential level of the field deflection energy.

It is a principal objective of the present concept to determine what, if any, movement of target 16 occurs within a predetermined time period, and then to utilize the information thus obtained to bring about a reorientation of the tracking apparatus. In brief, this is accomplished by storing data representing some characteristic of the target 16 at a particular instant of time, and then comparing this stored data with information concerning the same characteristic which is derived after a predetermined interval. Any discrepancy between the respective bits of information thus compared will be indicative of the amount of target movement as well as the particular direction in which such movement occurs.

In accordance with this objective, the data stored by the memory device 68 consists of the center line scan (wave *a* in FIG. 3) of a particular field deflection of the electron beam 50 of Vidicon 35. It will be recalled that the trigger circuit 62 functions to select only those particular field deflections which are to be utilized for the purpose of this comparison. Furthermore, memory device 68 (which may be a standard storage tube of the "write-erase" type, or a sensitized drum the speed of rotation of which is synchronized with the operation of the field deflection generator 54) retains the information present in the center line of a particular field selected by the trigger circuit 62, and then presents this stored information during the next subsequent field scanning the time of occurrence of which is determined by the amount of frequency division incorporated into the circuit 62. In any event, the output of the memory device 68 represents a single line scan of the Vidicon screen 30, this line scan occurring in the center of one particular field represented by a complete traversal in both directions of screen 30 by the electron beam 50.

Figure 3:
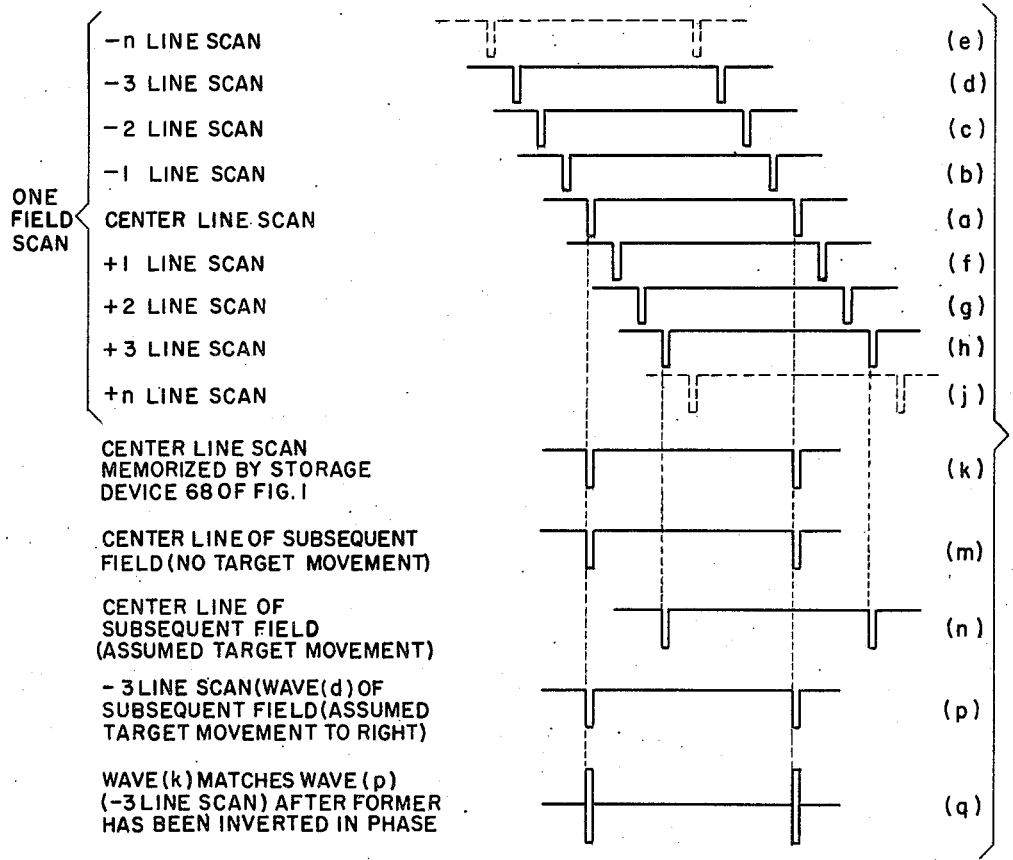
FIG. 3 is a set of wave forms useful in explaining the operation of the circuit of FIG. 2.

Due to the action of the "skewing" circuit 56, the video output of tube 35 as it appears in conductor 52 will be made up of individual line scans which are time-displaced with respect to one another as brought out in FIG. 3 of the drawings. The bias imposed by the "skewing" circuit 56 on the field deflection energy will result in a regular displacement of successive line scans in a direction which appears as horizontal in the drawings. For example, with wave form *a* of FIG. 3 representing the center line scan of a particular field, then a number of prior line scans can be represented by wave forms *b*, *c*, *d* and *e*. In similar fashion, subsequent line scans in the same field may be designated by wave forms *f*, *g*, *h* and *j*. In practice it has been found desirable to select a definite number of lines (such as 10, for example, between $-n$ and $+n$) both above and below the center line scan in order to achieve optimum operation. As will be noted in FIG. 3, a regular cyclic displacement of these successive line scans occurs from left to right to form a raster having the configuration of a parallelogram.

The center line selector 64 in effect picks out the middle line scan from each field as initiated by the trigger circuit 62, the data represented by this wave being stored by the memory device 68. This energy thus stored is designated as curve $k$ in FIG. 3, which is identical in all respects to curve $a$.

During the next subsequent field scan of the Vidicon screen 30, the effective output of the tube (that is, those line scans lying between $-n$ and $+n$ as indicated in FIG. 3) is applied directly to the wave comparator 66. This wave comparator 66 may be of any conventional design, such, for example, as a transformer having a core 72 and a pair of primary windings 74 and 76 to which are respectively applied the output of the storage device 68 and the video signal from the Vidicon 35. The windings 74 and 76 of the transformer are wound in phase opposition, so that equal voltages applied thereto will result in a cancellation of energy and no current will flow through a secondary coil 78 to an output conductor 80.

Referring again to FIG. 3 it will be seen that, when there has been no change in the speed or direction of movement of target 16 between successive field scans of the Vidicon screen 30, then the center line scans of successive fields will coincide. This is shown by the relationship between wave forms $k$ and $m$. Since the stored data $k$ is effectively inverted in phase by the manner in which coil 74 is wound, equal and opposite currents will flow through windings 74 and 76, and the output of coil 78 as it appears in conductor 80 will be zero. If it is assumed, however, that there has been a change in the positional characteristics of the target during this time period, then the center line scan of the next field following the storage of line scan $k$ by the memory device 68 will be displaced either to the right or to the left as shown in wave forms $b$ through $j$ of FIG. 3. An assumed target movement to cause a center line displacement to the right is represented by wave form $n$. It is seen that wave forms $k$ and $n$ no longer coincide in phase (time).

The memorized information $k$ will, however, essentially "match" one of the wave forms $b$ through $j$ regardless of the direction of target movement and of its magnitude within the capabilities of the apparatus. Inasmuch as a complete set of line scans is being applied to the wave comparator 66 over conductor 52 for the field being last presented, the output of the memory device 68 must necessarily be in substantial phase coincidence with one of these particular line scans. In FIG. 3 of the drawings the movement of the target has been such that wave form $k$ "matches" the $-3$ line scan of such field as represented by wave form $d$, this latter scan being displaced to the right due to the action of the skewing circuit 56. Inasmuch as the respective scans to be "matched" are applied to the phase-opposed coils 74 and 76, cancellation of output in conductor 80 now occurs "above" the center line of the field—i.e., at an instant prior to that when the respective line scans would have coincided if no target movement had taken place.

The servo motors (not shown) connected to the elevational and azimuthal control devices for the tracking unit 10 are arranged to be responsive to positive and negative pulses, which determine the duration and magnitude of their operation. This is standard practice. Assuming that the servo motor control circuit is designed so that line scan $-n$ develops a positive-going pulse to initiate operation of a particular servo motor to the left (for example) and that all line scans below that which produce a zero output yield a negative pulse, then it will be seen that when "matching" of wave form $k$ occurs at the center line of the subsequently-scanned field, the zero output produced at this point will result in balanced positive and negative voltages being developed from an equal number of pulses of each polarity occurring above and below the center line $a$ as shown in FIG. 3. However, when "matching" occurs at some other time instant (as that chosen for an example in the drawing where wave form $p$ is "matched" with wave form $k$ at the $-3$ line scan) then the number of positive pulses will be reduced while the number of negative pulses will be increased. This will yield an unbalanced output to the servo motor to result in a realignment of the optical tracking unit 10.

The above mode of operation will be readily understood if it is appreciated that all line scans in one direction from the center initiate pulses of a particular polarity, and that all line scans in the opposite direction from center initiate pulses of the other polarity. If "matching" occurs in the exact center of the field, the number of positive- and negative-going pulses will be equal, and no acceleration or deceleration of the servo motor will take place. In other words, for a steady target, the impulses applied to the respective right and left servo motors are equal, and result in effective cancellation of any acceleration component. However, for a target moving (say to the right), the impulse difference $(I_R - I_L)$ is proportional to target movement between the two fields that are compared, and will be positive to actuate the tracking unit 10 to the right. On the other hand, if the target moves to the left, the impulse difference $(I_L - I_R)$ causes the servo motor to actuate the tracking unit to the left. It has been mentioned above that similar effects are developed in an azimuthal direction, but since they are identical to those set forth above they will not be discussed in detail.

Obviously many modifications and variations of the present invention are possible in the light of the above teachings. It is, therefore, to be understood that within the scope of the appended claims the invention may be practiced otherwise than as specifically described.

I claim:

1. An electrooptical tracking system by means of which a camera is caused to follow an airborne target the speed and/or direction of movement of which is subject to variation, and wherein said camera is provided with electroresponsive apparatus for controlling its orientation with respect to both elevation and azimuth, said tracking system comprising: optical means for dividing the light received thereby, such light including illumination representative of said target, and directing the light so divided along two separate paths; a lens in each of the two said light paths, the lens in each path acting to derive from the light impinging thereon one particular characteristic of said target, each of said lenses also acting to develop this target characteristic so derived in a focal plane lying essentially normal to the path of the light received by the lens; a pair of photosensitive cathode-ray pickup tubes, one tube being so positioned that its screen lies essentially in the focal plane of the target characteristic developed by one of said lenses, and the other tube being so positioned that its screen lies essentially in the focal plane of the target characteristic developed by the remaining lens; means for deflecting the cathode-ray beam of each of the said pickup tubes in two mutually perpendicular line scanning and field scanning directions to traverse the respective screens thereof; means for progressively offsetting each line scanning action of each cathode-ray tube in a direction parallel to such line scan to result in an effective raster area having the configuration of a nonrectangular parallelogram; means associated with each cathode-ray tube for selecting and memorizing from the output of each field scan energy representing only the center line scan thereof; means also associated with each cathode-ray tube for comparing such stored energy with each of the line scans developed in a field produced subsequent to that from which the said center line scan is selected and stored; and means for applying the respective outputs of the two comparing means to the said electroresponsive apparatus to control the orientation of said camera in both elevation and azimuth, whereby said camera is caused to accurately follow the movement of said airborne target.

2. An electrooptical tracking system according to claim 1, in which the lens in each of two separate paths formed by dividing the light received by said optical system from said target is of the semicylindrical type having a focusing effect in one of two mutually perpendicular directions only, the lens in each separate light path being disposed essentially at right angles to the lens in the other light path.

3. An electrooptical tracking system according to claim 1, in which the said comparing means comprises a transformer having two phase-opposed primary windings to which are respectively applied the output of said memorizing means and the output of said cathode-ray tube as represented by a series of line scans developed in a field produced subsequent to that from which the memorized energy was derived.

4. An electrooptical tracking system according to claim 3, in which the means for progressively offsetting each line scanning action of each cathode-ray tube includes a circuit for adding a periodically increasing bias to the output of the cathode-ray beam line deflecting means.

5. In an electrooptical tracking system, a camera which is selectively movable to follow a moving object so as to produce in the field of view of said camera an image of said object, means for effecting changes in the orientation of said camera in response to changes in the speed and/or direction of motion of said object, said last-mentioned means including an optical system associated with said camera for deriving from the light received thereby one characteristic of said object as it appears in the field of view of said optical system, means for producing a single scan across the field of view of said optical system at a particular instant of time to obtain energy representative of said object characteristic, means for storing the energy so obtained, means for producing a further single scan across the identical portion of the field of view of said optical system at a subsequent instant of time, means for comparing the phase displacement, if any, between each corresponding characteristic point of the scan first produced and stored and each characteristic point of the scan subsequently produced, means energized as a function of the direction and magnitude of such phase displacement for generating a control signal, and means for applying the control signal thus generated to effect a change in the movement of said camera.

6. The combination of claim 5, in which the means for comparing the phase displacement, if any, between corresponding characteristic points of the scan first made and stored and that of the scan subsequently produced includes means for developing a number of replicas of said subsequent line scan, certain ones of said replicas being shifted in phase by different amounts in one direction from said subsequent line scan and certain others of said replicas being shifted in phase by different amounts in the other direction from said subsequent line scan, whereby the scan first produced will at least closely match the phase one of the said replicas, the phase status of the particular replica so matched being determinative of the magnitude and polarity of the control signal applied to the camera orientation means.

7. A system for automatically holding a camera aimed at a selected object moving in the field of view of said camera, said system comprising means for developing in the said camera field of view a particular object characteristic which appears at different points in said field, means for making a first single linear scan in a selected direction completely across the field of view of said camera so that the developed characteristic of said object falls in the path of, and at different points in, such linear scan, means for making a second single linear scan of the same nature and in the same direction as said first scan and traversing the same portion of the field of view of said camera but at a time subsequent to that at which said first scan was made, means for comparing the phase displacement between each characteristic point on said first scan and each corresponding point on said second scan, and means for developing a voltage representative of the amount and direction of such phase displacement for automatically holding said camera aimed at the selected object.

References Cited in the file of this patent
UNITED STATES PATENTS
2,499,178   Berry et al. _____ Feb. 28, 1950